(12) United States Patent
Do (10) Patent No.: US 12,371,009 B2
(45) Date of Patent: Jul. 29, 2025

(54) METHOD FOR AUTOMATED STEERING OF A MOTOR VEHICLE

(71) Applicants: RENAULT S.A.S, Boulogne Billancourt (FR); NISSAN MOTOR CO., LTD., Yokohama (JP)

(72) Inventor: Anh-Lam Do, Antony (FR)

(73) Assignees: AMPERE S.A.S, Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 148 days.

(21) Appl. No.: 18/254,042

(22) PCT Filed: Nov. 15, 2021

(86) PCT No.: PCT/EP2021/081746
§ 371 (c)(1),
(2) Date: May 23, 2023

(87) PCT Pub. No.: WO2022/112047
PCT Pub. Date: Jun. 2, 2022

(65) Prior Publication Data
US 2024/0001914 A1 Jan. 4, 2024

(30) Foreign Application Priority Data
Nov. 24, 2020 (FR) .......................... 2012064

(51) Int. Cl.
*B60W 30/09* (2012.01)
*B60W 10/184* (2012.01)
*B60W 10/20* (2006.01)

(52) U.S. Cl.
CPC .......... *B60W 30/09* (2013.01); *B60W 10/184* (2013.01); *B60W 10/20* (2013.01);
(Continued)

(58) Field of Classification Search
CPC ............... B60W 10/184; B60W 10/20; B60W 2520/10; B60W 2520/14; B60W 2710/18; B60W 2710/207; B60W 30/09
See application file for complete search history.

(56) References Cited

U.S. PATENT DOCUMENTS

| | | | |
|---|---|---|---|
| 5,302,010 A | 4/1994 | Ehmer et al. | |
| 2008/0172153 A1* | 7/2008 | Ozaki ................. | B60T 8/17557 701/41 |

(Continued)

FOREIGN PATENT DOCUMENTS

| | | |
|---|---|---|
| CN | 111959500 A | 11/2020 |
| CN | 109849610 B * | 10/2021 |

(Continued)

OTHER PUBLICATIONS

International Search Report issued Feb. 7, 2022 in PCT/EP2021/081746 filed on Nov. 15, 2021, citing documents 1-2 & 15-17 therein, 2 pages.

(Continued)

*Primary Examiner* — Babar Sarwar
(74) *Attorney, Agent, or Firm* — Oblon, McClelland, Maier & Neustadt, L.L.P.

(57) ABSTRACT

A method for automated steering of a motor vehicle including wheels at least two of which are steered wheels. The method comprising: acquiring parameters relating to a path for avoidance of an obstacle by the motor vehicle, and calculating, by a computer, a first steering setpoint for a steering actuator for the steered wheels and a second steering setpoint for at least one actuator for differential braking of the wheels, depending on the parameters. The first and second steering setpoints are each determined by a controller respecting a model that limits setpoint variation and/or range.

10 Claims, 3 Drawing Sheets

(52) U.S. Cl.
CPC ..... *B60W 2520/10* (2013.01); *B60W 2520/14* (2013.01); *B60W 2710/18* (2013.01); *B60W 2710/207* (2013.01)

(56) References Cited

U.S. PATENT DOCUMENTS

| | | | | |
|---|---|---|---|---|
| 2012/0283907 | A1* | 11/2012 | Lee | B60T 8/17557 |
| | | | | 701/32.9 |
| 2013/0144476 | A1* | 6/2013 | Pinto | B60L 50/00 |
| | | | | 903/930 |
| 2013/0211678 | A1* | 8/2013 | Lee | B60W 10/20 |
| | | | | 701/42 |
| 2015/0329140 | A1* | 11/2015 | Tamaizumi | B62D 6/003 |
| | | | | 701/42 |
| 2016/0264135 | A1* | 9/2016 | Yamakado | B62D 15/0265 |
| 2016/0264136 | A1* | 9/2016 | Minoiu Enache | B60W 30/095 |
| 2016/0311416 | A1* | 10/2016 | Bretzigheimer | B60T 8/246 |
| 2016/0362136 | A1* | 12/2016 | Oya | B62D 5/0454 |
| 2017/0115662 | A1* | 4/2017 | Mori | B60W 30/02 |
| 2017/0351262 | A1* | 12/2017 | Suzuki | B60K 31/00 |
| 2020/0047749 | A1* | 2/2020 | Morotomi | B60W 30/09 |
| 2021/0253093 | A1* | 8/2021 | Morotomi | G08G 1/166 |

FOREIGN PATENT DOCUMENTS

| | | | | |
|---|---|---|---|---|
| EP | 2338758 | A1 * | 6/2011 | .............. B60T 7/042 |
| EP | 3 608 190 | A1 | 2/2020 | |
| FR | 3088275 | A1 * | 5/2020 | ......... B60R 21/0134 |
| WO | WO-2012060555 | A2 * | 5/2012 | .......... B60L 15/2036 |
| WO | WO-2020099098 | A1 * | 5/2020 | ......... B60R 21/0134 |

OTHER PUBLICATIONS

Preliminary French Search Report issued Apr. 29, 2021 in French Application No. 2012064 filed on Nov. 24, 2020, citing documents 1-2 & 15-17 therein, 3 pages (with English Translation of Category of Cited Documents).

* cited by examiner

METHOD FOR AUTOMATED STEERING OF A MOTOR VEHICLE

TECHNICAL FIELD OF THE INVENTION

The present invention relates in general to automation of the following of trajectories of motor vehicles.

It has a particularly advantageous application in the context of aids for the driving of motor vehicles.

It more particularly relates to a process for automated piloting of a motor vehicle, allowing this vehicle to follow an obstacle evasion trajectory.

It also relates to a motor vehicle equipped with a computer adapted to carry out this process.

PRIOR ART

With a view to the safety of motor vehicles, they are currently equipped with driving assistance systems or self-driving systems.

Among these systems, automatic emergency braking systems (more commonly known by the abbreviation AEB) are known, which are designed to avoid any collision with obstacles located on the path taken by the vehicle. These systems are designed to detect an obstacle on the road and, in this situation, to intervene on the conventional braking system of the motor vehicle.

There are, however, situations in which these emergency braking systems do not make it possible to avoid a collision or cannot be used (for example if another vehicle is following too close behind the motor vehicle).

For these situations, automatic evasion systems (more commonly known by the abbreviation AES for "Automatic Evasive Steering" or "Automatic Emergency Steering") have been developed, which make it possible to avoid the obstacle by diverting the vehicle from its trajectory, by intervening either on the steering of the vehicle or on the differential-braking system of the vehicle.

An obstacle evasion process is also known from the document WO2020099098, in which the steering-angle and differential-braking systems are commanded in combination in order to manage the evasive trajectory. The steering-angle system is used to ensure good stability at medium speeds, while the braking system is used at high speeds.

It sometimes happens that this AES system imposes on the vehicle a trajectory that is at the limit in terms of controllability, which does not allow the driver to take over the driving of the vehicle again in full capacity.

SUMMARY OF THE INVENTION

In order to overcome the aforementioned drawback of the prior art, the present invention proposes to use a mixed controller which intervenes both on the steering angle of the steered wheels and on the differential braking of the right and left wheels of the vehicle, and which is adapted to create a piloting setpoint that limits the amplitude and/or the rate of the steering change imposed on the motor vehicle.

More particularly, the invention provides a process for automated piloting of a motor vehicle, having steps of:
  acquiring parameters relating to a trajectory for the motor vehicle to avoid an obstacle, and of
  calculating by a computer a first piloting setpoint of a steering-angle actuator of the steered wheels and a second piloting setpoint of at least one differential-braking actuator of the wheels, as a function of said parameters,
  wherein the first piloting setpoint and the second piloting setpoint are each determined by means of a control that satisfies a setpoint amplitude and/or variation limiting model.

Thus, by virtue of the invention, it is possible to use a mixed control law that intervenes on the steering angle and on the differential braking so that the vehicle follows an obstacle evasion trajectory. This control law is optimized in order to ensure a control of the vehicle which performs well (that is to say it is rapid enough to ensure the obstacle evasion) and is stable and robust.

For this purpose, the invention proposes to apply constraints in terms of amplitude and rate (that is to say of setpoint variation). It preferably furthermore proposes to inhibit the calculation of the piloting setpoints, when this proves necessary, that is to say to stop the control of the brakes or of the steering angle when the conditions so require. This stopping may be temporary or permanent, until a new activation of the AES system.

Other advantageous and nonlimiting characteristics of the process according to the invention, taken individually or in any technically feasible combinations, are as follows:
  the first piloting setpoint and/or the second piloting setpoint is determined by means of a controller that satisfies a setpoint amplitude and variation limiting model;
  the first piloting setpoint and the second piloting setpoint are determined as a function of a coefficient that fixes the contribution of each actuator (in the piloting of the steering of the vehicle), said coefficient being calculated as a function of a yaw velocity of the motor vehicle and a torque applied by the driver to the steering wheel of the motor vehicle;
  said coefficient also being calculated as a function of a parameter, the value of which varies according to whether or not the first piloting setpoint is saturated (that is to say according to whether or not it is limited by the controller);
  the coefficient is calculated so that the second piloting setpoint is zero if the absolute value of a torque applied by a driver to a steering wheel of the motor vehicle exceeds a predetermined threshold;
  the coefficient is calculated so that only the steering-angle actuator of the steered wheels is used when the yaw velocity of the vehicle is greater than a control threshold and/or when the first piloting setpoint on its own makes it possible to stabilize the motor vehicle;
  the coefficient is calculated so that the steering-angle actuator of the steered wheels and the differential-braking actuator of the wheels are otherwise used in combination;
  the coefficient is calculated so as to vary continuously as a function of time;
  provision is made to interrupt (preferably permanently) the determination of the first piloting setpoint when the absolute value of a torque applied by a driver to a steering wheel of the motor vehicle exceeds a predetermined threshold;
  provision is made to interrupt (temporarily or permanently) the determination of the second piloting setpoint when the absolute value of a torque applied by a driver to a steering wheel of the motor vehicle exceeds another predetermined threshold;
  the controller that makes it possible to determine the second piloting setpoint satisfies an amplitude limiting model, so that the second piloting setpoint remains less than or equal to a limit value;

said limit is determined as a function of the velocity of the vehicle and the yaw velocity of the motor vehicle;

in order to calculate the first piloting setpoint, provision is made to determine a first non-saturated setpoint and to deduce the first setpoint therefrom by means of a closed-loop pseudo-controller having a direct-chain transfer function that comprises a function of the hyperbolic tangent type of the deviation between the first non-saturated setpoint and the first setpoint;

in order to calculate the second setpoint, provision is made to determine a second non-saturated setpoint and to deduce a second semi-saturated setpoint therefrom by means of a closed-loop pseudo-controller having a direct-chain transfer function that comprises a function of the hyperbolic tangent type of the deviation between the second non-saturated setpoint and the second semi-saturated setpoint, then to use another closed-loop pseudo-controller, which provides the second setpoint as output and the direct-chain transfer function of which comprises a function of the hyperbolic tangent type of the deviation between the second semi-saturated setpoint and said second setpoint.

The invention also provides a method for creating controllers with a view to their use in a piloting process as mentioned above, wherein provision is made:

to acquire a behavioral matrix model of the apparatus, to determine at least some of the coefficients of the matrices of the behavioral matrix model, to deduce two controllers therefrom, each of which satisfies the following of the trajectory to be taken, namely a piloting setpoint amplitude limiting model and/or a piloting setpoint variation limiting model.

The invention also provides a motor vehicle comprising a steering-angle actuator of the steered wheels, a differential-braking actuator of the wheels, and a computer for piloting said actuators, which is programmed in order to carry out a process as mentioned above.

The various characteristics, variants and embodiments of the invention may of course be combined with one another in various combinations so long as they are not mutually incompatible or exclusive.

DETAILED DESCRIPTION OF THE INVENTION

The description that follows with reference to the appended drawings, which are given by way of nonlimiting examples, will clearly explain what the invention consists in and how it may be carried out.

Figure 1:
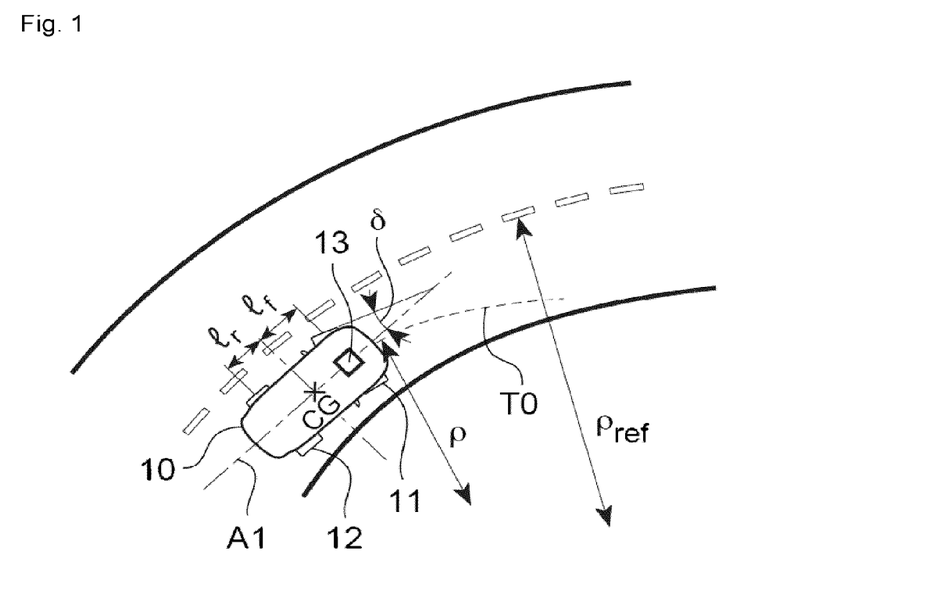
FIG. 1 is a schematic view from above of a motor vehicle traveling on a road, on which the trajectory that this vehicle is meant to take is represented.

FIG. 1 represents a motor vehicle 10 which, in the conventional way, comprises a chassis that delimits a passenger compartment, two steered front wheels 11 and two non-steered rear wheels 12. As a variant, these two rear wheels could also be steered, although this would require adaptation of the command law described below.

This motor vehicle 10 has a conventional steering system making it possible to intervene on the orientation of the front wheels 11 so as to be able to turn the vehicle. This conventional steering system has in particular a steering wheel connected to tie rods in order to make the front wheels 11 pivot. In the example considered, it also has an actuator 31 (represented in FIG. 6) making it possible to intervene on the orientation of the front wheels as a function of the orientation of the steering wheel and/or as a function of a request received from a computer 13.

In addition, this motor vehicle has a differential-braking system making it possible to intervene directly on the front wheels 11 (and on the rear wheels 12) so as to decelerate the motor vehicle while making it turn. This differential-braking system comprises, for example, a piloted differential or electric motors, which are positioned at the wheels of the vehicle, or brake calipers that are piloted independently of one another. It also has at least one actuator 32 (represented in FIG. 6), which is designed to intervene directly on the rotational speeds of the wheels as a function of a request received from a computer 13. It will be assumed here that it has a plurality of actuators 32.

Figure 6:
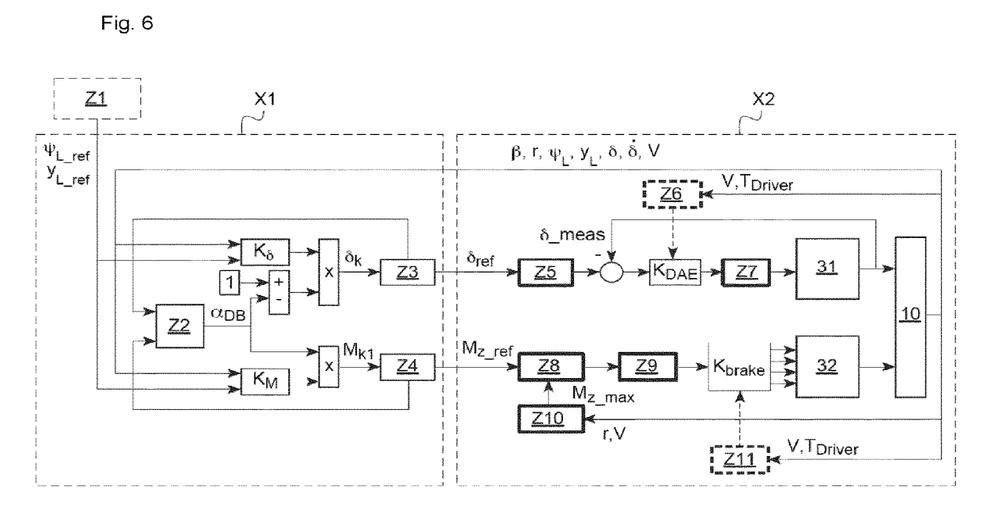
FIG. 6 is a graph illustrating the various saturation and inhibition functions that can be used in the scope of this procedure of piloting the motor vehicle.

The computer 13 is then intended to pilot the assisted-steering actuator 31 and the actuators 32 of the differential-braking system as a function of the traffic conditions encountered. For this purpose, it has at least one processor, at least one memory, and an input and output interface.

By virtue of its interface, the computer 13 is adapted to receive input signals coming from various sensors.

Among these sensors, the following are for example provided:

a device, such as a front camera, making it possible to identify the position of the vehicle in relation to its road lane, a device, such as a RADAR or LIDAR remote detector, making it possible to detect an obstacle 20 lying on the trajectory of the motor vehicle 10 (FIG. 2), at least one lateral detection device, such as a RADAR or LIDAR, making it possible to observe the environment to the sides of the vehicle, a device, such as a gyrometer, making it possible to determine the yaw rotation velocity (about a vertical axis) of the motor vehicle 10, a sensor of the position and angular velocity of the steering wheel, and a sensor of the torque applied by the driver to the steering wheel.

By virtue of its interface, the computer 13 is adapted to transmit one setpoint to the assisted-steering actuator 31 and another setpoint to the actuators 32 of the differential-braking system.

Figure 2:
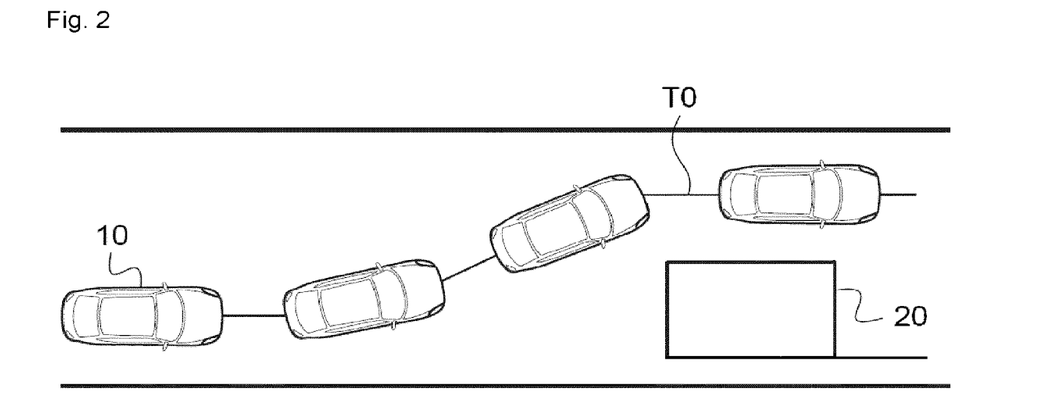
FIG. 2 is a schematic perspective view of the motor vehicle of FIG. 1, represented in four successive positions that lie along a trajectory for avoiding an obstacle.

It also makes it possible to force the vehicle to follow a trajectory T0 for avoiding the obstacle 20 (see FIG. 2).

By virtue of its memory, the computer 13 stores data used in the scope of the process described below.

In particular, it stores application software consisting of computer programs comprising instructions, the execution of which by the processor makes it possible for the process described below to be carried out by the computer.

Before describing this process, the different variables that will be used may be introduced, some of which are illustrated in FIG. 1.

The total mass of the motor vehicle will be denoted "m", and will be expressed in kg.

The inertia of the motor vehicle about a vertical axis passing through its center of gravity CG will be denoted "J" or "$I_z$", and will be expressed in N.m.

The distance between the center of gravity CG and the front axle of the vehicle will be denoted "$l_f$", and will be expressed in meters.

The distance between the center of gravity CG and the rear axle will be denoted "$l_r$", and will be expressed in meters.

The cornering stiffness coefficient of the front wheels will be denoted "$C_f$", and will be expressed in N/rad.

The cornering stiffness coefficient of the rear wheels will be denoted "$C_r$", and will be expressed in N/rad.

These cornering stiffness coefficients of the wheels are concepts well known to a person skilled in the art. By way of example, the cornering stiffness coefficient of the front wheels is thus that which allows the equation $F_f = 2 \cdot C_f \cdot \alpha_f$ to be written, with $F_f$ the lateral slip force of the front wheels and $\alpha_f$ the drift angle of the front wheels.

The steering angle that the steered front wheels make with the longitudinal axis A1 of the motor vehicle 10 will be denoted "δ", and will be expressed in rad.

The variable $\delta_{ref}$ expressed in rad, will denote the saturated steering-angle setpoint, as will be transmitted to the assisted-steering actuator.

The variable $\delta_K$, expressed in rad, will denote the non-saturated steering-angle setpoint. At this stage, it may only be stated that the concept of saturation will be linked with limits of value or value variation.

The yaw velocity of the vehicle (about the vertical axis passing through its center of gravity CG) will be denoted "r", and will be expressed in rad/s.

The relative heading angle between the longitudinal axis A1 of the vehicle and the tangent to the evasion trajectory T0 (desired trajectory of the vehicle) will be denoted "$\Psi_L$", and will be expressed in rad.

The lateral deviation between the longitudinal axis A1 of the motor vehicle 10 (passing through the center of gravity CG) and the evasion trajectory T0, at a sighting distance "ls" lying in front of the vehicle, will be denoted "$y_L$", and will be expressed in meters.

The setpoint of lateral deviation between the longitudinal axis A1 of the motor vehicle 10 (passing through the center of gravity CG) and the evasion trajectory T0, at a sighting distance "ls" lying in front of the vehicle, will be denoted "$y_{L\text{-}ref}$", and will be expressed in meters.

The trajectory following error will be denoted "$e_{yL}$", and will be expressed in meters. It will be equal to the difference between the lateral deviation setpoint $y_{L\text{-}ref}$ and the lateral deviation $y_L$.

The aforementioned sighting distance "ls" will be measured from the center of gravity CG, and will be expressed in meters.

The drift angle of the motor vehicle 10 (the angle which the velocity vector of the motor vehicle makes with its longitudinal axis A1) will be denoted "β", and will be expressed in rad.

The velocity of the motor vehicle along the longitudinal axis A1 will be denoted "V", and will be expressed in m/s.

The constant "g" will be the acceleration due to gravity, expressed in m·s⁻².

The average curvature of the road level with the motor vehicle will denoted $\rho_{ref}$ and will be expressed in m⁻¹.

The setpoint of yaw moment to be applied by virtue of the differential-braking means will be denoted "$M_{z\_ref}$", and will be expressed in N.m.

The constants "ξ" and "ω" will represent dynamic characteristics of the steering angle of the front wheels of the vehicle.

The constant "$\omega_f$" will for its part represent a dynamic characteristic of an arbitrary bounded perturbation "w" applied to the vehicle.

The steering-angle velocity will denote the steering angular velocity of the steered front wheels.

As an assumption, the road on which the motor vehicle is moving is presumed to be straight and flat. They extend along a principal axis.

Before describing the process that will be performed by the computer 13 in order to carry out the invention, in a first part of this explanation the constraints that are selected in order to ensure effective piloting of the motor vehicle may be summarized, then the calculations that have made it possible to achieve the controllers allowing the invention to be implemented may be described, so as to understand clearly where these calculations come from and on what they are based.

In the part X1 of FIG. 6, the procedure of calculating the saturated steering-angle setpoint $\delta_{ref}$ to be transmitted to the assisted-steering actuator 31, and the yaw setpoint moment $M_{z\_ref}$ to be transmitted to the differential-braking actuators 32, has been modeled.

The part X2 is in turn given over to schematizing the way in which these setpoints interact with the actuators 31, 32.

This second part X2 shows the constraints that are applied to the aforementioned setpoints so as to ensure stability and controllability of the vehicle by the driver when a driving assistance system of the AES type is activated.

The first constraint Z5, which is applied to the saturated steering-angle setpoint $\delta_{ref}$, is a velocity saturation. It is more precisely a limitation of the steering-angle velocity of the vehicle. The steering angular velocity threshold used is denoted υ.

This first constraint, by virtue of a feedback loop that provides the current steering angle $\delta_{\_meas}$, and a controller $K_{DAE}$, makes it possible to obtain a provisional engine torque.

The second constraint Z7, which is applied to the output of the controller $K_{DAE}$, is an amplitude saturation. It is more precisely a limitation of the absolute value of the aforementioned provisional engine torque. The engine torque threshold used is denoted $ne_{EPS\_saturation\_1}$.

The block Z6 illustrates a first mechanism for inhibiting the regulation of the saturated steering-angle setpoint $\delta_{ref}$. This first mechanism is intended to block the regulation, and therefore the calculation of any engine torque to be provided to the assisted-steering actuator 31, when the absolute value of the torque exerted by the driver on the steering wheel exceeds a threshold denoted $T_{Driver\_\delta}^{ctrl}$.

The third constraint Z8, which is applied to the yaw-moment setpoint $M_{z\_ref}$, is an amplitude saturation. It is more precisely a limitation of the value of this yaw-moment setpoint $M_{z\_ref}$, the aim of which is to prevent the differential braking from being too great and preventing satisfactory stability and controllability of the vehicle from being ensured. The yaw moment threshold used is referred to as limit $M_{z\_max}$.

The limit $M_{z\_max}$ used for this saturation will preferably be variable. It will be calculated (in block Z10) as a function of at least the yaw velocity r and the velocity V of the vehicle. It may optionally also depend on the torque exerted by the driver on the steering wheel.

The fourth constraint Z9, which is applied to the amplitude-saturated yaw-moment setpoint $M_{z\_ref}$, is a velocity saturation. It is more precisely a limitation of the rate of variation of the yaw-moment setpoint $M_{z\_ref}$. The yaw moment variation rate threshold used is denoted $\nabla M_z^{ctrl}$ (it will also appear with the simplified notation $\nabla$).

This fourth constraint, by virtue of a controller $K_{Brake}$, makes it possible to obtain a braking torque to be provided to the actuators 32 of the differential-braking system.

This fourth constraint is considered to be preferable in order to improve the controllability of the vehicle when turning off or resuming the yaw-moment setpoint $M_{z\_ref}$.

The block Z11 illustrates a second mechanism for inhibiting the regulation of the yaw-moment setpoint $M_{z\_ref}$. This second mechanism is intended to block the regulation and therefore the calculation of any differential engine torque, when the absolute value of the torque exerted by the driver on the steering wheel exceeds a threshold denoted $T_{Driver\_Mz}^{ctrl}$.

The aforementioned thresholds $\upsilon$, $T_{EPS\_saturation\_1}$ and $\nabla_{Mz}^{ctrl}$ are obtained by carrying out road trials with the aid of a test vehicle of the same model as the vehicles on which the invention will be implemented.

In particular, the threshold $T_{EPS\_saturation\_1}$ is obtained for different velocities V of the vehicle since it varies as a function of this parameter. It is obtained by carrying out trials while the differential-braking function is deactivated.

Likewise, the thresholds $\upsilon$ and $\nabla_{Mz}^{ctrl}$ are obtained by means of road trials for different velocities V of the vehicle since they vary as a function of this parameter.

The limit $M_{z\_max}$ is for its part obtained in a particular way, with the aid of the block Z10.

This limit is selected to be equal to a variable, denoted $\overline{M}_z^{ctrl}$, if the yaw velocity r of the vehicle exceeds in absolute value a yaw velocity threshold which will be denoted here as $r^{ctrl}$. The limit $M_{z\_max}$ will otherwise be selected to be equal to zero.

This may be written in the form of the following equation Math1:

$$M_{z\_math} = \begin{cases} \overline{M}_z^{ctrl} & \text{if } |r| \geq \overline{r}^{ctrl} \\ 0 & \text{else} \end{cases} \qquad [\text{Math. 1}]$$

Figure 4:
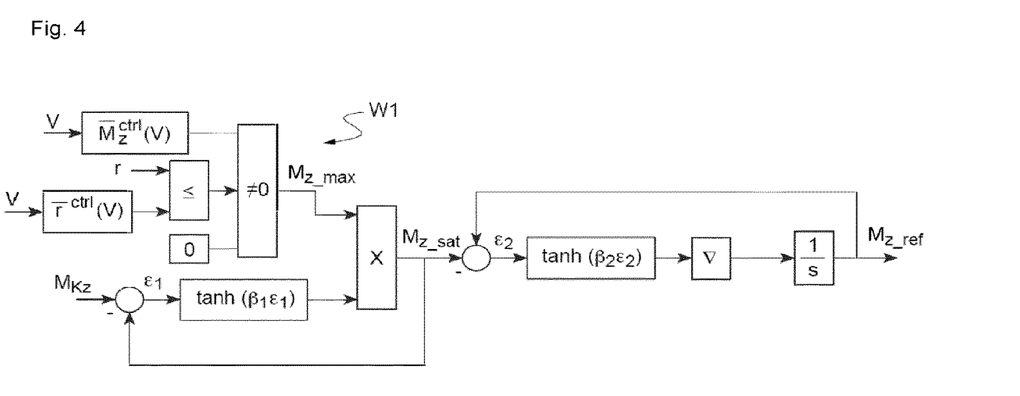
FIG. 4 is a diagram illustrating closed-loop transfer functions used to implement saturation functions of the differential braking of the wheels of the vehicle.

It may also be represented graphically, as shown by the part W1 of FIG. 4.

The yaw velocity threshold $r^{ctrl}$ corresponds to the maximum yaw velocity at which the vehicle is still controllable by the driver, at a given velocity V.

The yaw velocity threshold $r^{ctrl}$ and the variable $\overline{M}_z^{ctrl}$ are either determined by trials of the test vehicle or calculated, or are calculated then adjusted by means of trials. It is the first solution that is applied here.

For this purpose, during a first step, the differential-braking function of the test vehicle is deactivated then controllability trials of the vehicle are carried out in order to determine the thresholds usable for the constraints Z5 and Z7.

Next, during a second step, the differential-braking function of the vehicle is reactivated then new controllability trials are carried out in order to determine the maximum steering angle thresholds $\delta_{max}(V)$ for a plurality of different velocities (for example with an increment of 5 km/h). As a variant, these steering angle thresholds could be obtained by calculation.

Finally, during a third step, the yaw velocity threshold $r^{ctrl}$ and the variable $\overline{M}_z^{ctrl}$ are deduced therefrom.

The yaw velocity threshold $r^{ctrl}$ is more precisely obtained by modeling the vehicle by means of a bicycle model (described in more detail below), then by deducing the following equation therefrom:

$$\overline{r}^{ctrl}(V) = \frac{(l_f + l_r)V}{(l_f + l_r)^2 + k \cdot V^2} \delta_{max}(V) \qquad [\text{Math. 2}]$$

In this equation, k is the understeer gradient, which is calculated by means of the following equation:

$$k = m\left(\frac{l_r}{C_f} - \frac{l_f}{C_r}\right) \qquad [\text{Math. 3}]$$

By virtue of the same modeling, it is possible to obtain the variable $M_z^{ctrl}$ by means of the following equation:

$$\overline{M}_z^{ctrl}(V) = \frac{C_f C_r (l_f + l_r)}{(C_f + C_r)} \delta_{max}(V) \qquad [\text{Math. 4}]$$

The two inhibition mechanisms represented in FIG. 6 by the blocks Z6 and Z11 may now be addressed. These two mechanisms each involve a threshold $T_{Driver\_\delta}^{ctrl}$, $T_{Driver\_Mz}^{ctrl}$.

The threshold $T_{Driver\_\delta}^{ctrl}$ used to negate the steering-angle setpoint $\delta_{ref}$ is determined by controllability trials carried out on the vehicle when the differential-braking function is deactivated. This threshold varies as a function of the velocity V of the vehicle.

The threshold $T_{Driver\_Mz}^{ctrl}$ used to negate the yaw-moment setpoint $M_{z\_ref}$ is determined by controllability trials when the differential-braking system is active. This threshold also varies as a function of the velocity V of the vehicle.

It may be noted that these thresholds satisfy the following inequality:

$$T_{Driver\_Mz}^{ctrl}(V) \leq T_{Driver\_Saturation\_1}^{ctrl}(V) \leq T_{Driver\_\delta}^{ctrl}(V) \qquad [\text{Math. 5}]$$

In this inequality, the variable $T_{Driver\_Saturation\_1}^{ctrl}$ is obtained from the threshold $T_{EPS\_Saturation\_1}$. For this purpose, taking into account the function f corresponding to the assistance law of the assisted-steering actuator 31, the following may be written:

$$T_{Driver\_Saturation\_1}^{ctrl}(V) = f^{-1}(T_{EPS\_Saturation\_1}, V) \qquad [\text{Math. 6}]$$

Figure 5:
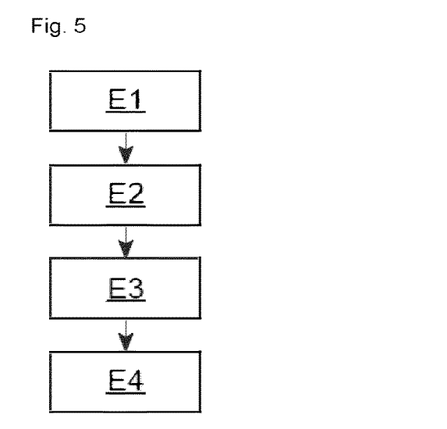
FIG. 5 is a diagram illustrating steps of an operation of determining values that can be used in a procedure of piloting a motor vehicle according to the invention.

At this stage of the description, the procedure making it possible to obtain the values of the aforementioned thresholds and variables in order to guarantee controllability of the vehicle may be summarized by using FIG. 5.

As this figure shows, during a first step E1, while the differential-braking function of the test vehicle is deactivated, controllability trials are performed in order to obtain the values of the thresholds $T_{EPS\_Saturation\_1}$ and $T_{Driver\_\delta}^{ctrl}$.

Next, during a second step E2, the differential-braking function being reactivated, a new series of controllability trials is performed in order to obtain the values of the maximum steering angles $\delta_{max}$.

In this step, the value of the threshold $T_{Driver\_Saturation\_1}^{ctrl}$ is also calculated.

During a third step E3, the thresholds $\overline{M}_z^{ctrl}$ and $\bar{r}^{ctrl}$ are calculated while taking into account the maximum steering angles $\delta_{max}$.

Finally, during a fourth step E4, the results of the controllability trials are used in order to refine the values of the thresholds $\overline{M}_z^{ctrl}$, $\bar{r}^{ctrl}$ and in order to determine the values of the threshold $\overline{\nabla}_{M_z}^{ctrl}$ and of the threshold of the driver torque $T_{Driver\_Mz}^{ctrl}$.

The various constraints mentioned above, and the way in which the choice between the steering angle of the steering wheel and the differential-braking system is made in order to pilot the vehicle, may now be formulated.

For this purpose, reference may be made to the left part X1 of FIG. 6.

In this figure, the block Z1 corresponds to the block that makes it possible to determine the trajectory to be followed in order to avoid the obstacle 20. Since the way in which this trajectory is determined does not form part of the subject matter of the present invention, it will not be described here. This block Z1 then makes it possible, when the AES function is activated, to determine the lateral deviation setpoint $y_{L-ref}$ and the relative heading angle LPL.

The block Z2 is the one that makes it possible to make a choice between the steering system and the differential-braking system in order to follow the evasion trajectory optimally. It makes it possible to determine the value of a coefficient $\alpha_{DB}$ that illustrates the proportion of the differential braking and of the steering angle which is to be applied. When its value is zero, the differential braking is deactivated, and when its value is maximum (equal to 1), it is the steering angle that is deactivated. This block will be described in detail below.

The block Z3 corresponds to the mathematical function that makes it possible to model the aforementioned constraints Z5 and Z7. It receives as input the non-saturated steering-angle setpoint $\delta_K$.

The block Z4 corresponds to the mathematical function that makes it possible to model the aforementioned constraints Z8 and Z9. It receives as input the non-saturated yaw-moment setpoint $M_{Kz}$.

These non-saturated setpoints are obtained with the aid of controllers denoted $K_\delta$ for the calculation of the non-saturated steering-angle setpoint $\delta_K$, and $K_M$ for the calculation of the non-saturated yaw-moment setpoint $M_{Kz}$. They depend on the coefficient $\alpha_{DB}$.

In order to understand the calculations underlying these two blocks, it may be assumed that the dynamic behavior of the vehicle can be modeled by means of the following equation Math7.

$$\begin{pmatrix} \dot{\beta} \\ \dot{r} \\ \dot{\psi}_L \\ \dot{e}_{y_L} \\ \dot{\delta} \\ \ddot{\delta} \\ \dot{y}_{L\_ref} \end{pmatrix} = \qquad [\text{Math 7}]$$

$$\begin{bmatrix} -\dfrac{C_f + C_r}{mV} & 1 + \dfrac{C_r l_r - C_f l_f}{mV^2} & 0 & 0 & 0 & \dfrac{C_f}{mV} & 0 \\ -\dfrac{C_f l_f - C_r l_r}{J} & -\dfrac{C_r l_r^2 - C_f l_f^2}{JV} & 0 & 0 & 0 & \dfrac{C_f l_f}{J} & 0 \\ 0 & 1 & 0 & 0 & 0 & 0 & 0 \\ V & l_s & V & 0 & 0 & 0 & -1 \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\omega_f \end{bmatrix}$$

$$\begin{pmatrix} \beta \\ r \\ \psi_L \\ e_{y_L} \\ \delta \\ \dot{\delta} \\ y_{L\_ref} \end{pmatrix} + \begin{bmatrix} 0 \\ 0 \\ 0 \\ 0 \\ \omega^2 \\ 0 \\ 0 \end{bmatrix} \delta_{ref} + \begin{bmatrix} 0 \\ 0 \\ 0 \\ 0 \\ 0 \\ 0 \\ \omega_f \end{bmatrix} w$$

This model is an improved bicycle model.

But it does not thereby make it possible to limit the steering-angle amplitude and velocity of the front wheels 11 of the vehicle, or the differential-braking moment applied to the wheels of the vehicle, or the variation of this braking moment. However, these limitations prove particularly important for ensuring that the driver of the vehicle can be capable of resuming control of the vehicle at any moment.

The saturation of the steering-angle velocity may be formulated in the following way:

$$|\dot{\delta}_{ref}| \leq \upsilon$$

In this equation Math 8, the threshold $\upsilon$ is for example equal to 0.0491 rad/s, which corresponds to 0.785 rad/s at the steering wheel (i.e. 45°/s) if the gear reduction coefficient of the steering is equal to 16.

Figure 3:
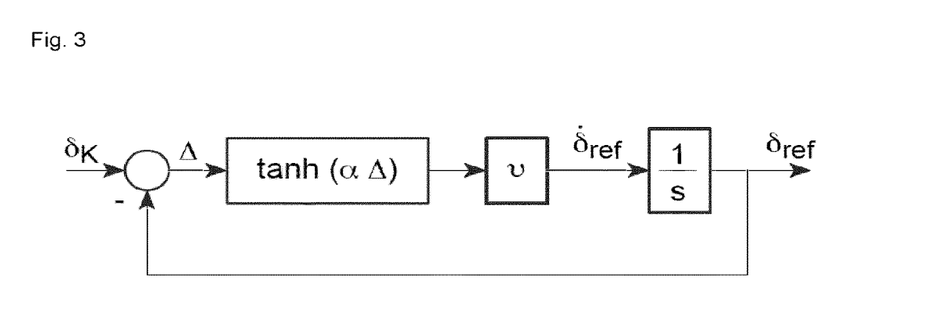
FIG. 3 is a diagram illustrating a closed-loop transfer function used to implement a saturation function of the steering angle of the wheels of the vehicle.

As shown by FIG. 3, the steering-angle velocity limiter is noteworthy insofar as it forms a closed-loop pseudo-controller (that is to say a controller carrying out simple and limited calculations), which has:
a direct-chain transfer function equal to the product of the threshold $\upsilon$ (in order to comply with the condition stipulated by the equation Math 8), a 1/s integrator and a corrector, which is a function of the hyperbolic tangent type of $\Delta \cdot \alpha$,
an indirect-chain (or "feedback-chain") transfer function equal to one.

A function of the hyperbolic tangent type is intended to mean the various functions that have a form similar to the hyperbolic tangent function, which includes in particular inverse trigonometric functions (such as the arctangent), the error function (commonly denoted erf), the Gudermannian function (commonly denoted gd) and the hyperbolic trigonometric function (such as hyperbolic tangent).

It receives as input the non-saturated steering-angle setpoint $\delta_{ref}$ and transmits as output the saturated steering-angle setpoint $\delta_{ref}$.

In this figure, the coefficient $\Delta$ corresponds to the deviation between the variables $\delta_K$ and $\delta_{ref}$. The coefficient $\alpha$ is a constant between 0 and infinity, which is the only parameter making it possible to affect the rapid or flexible nature of the steering-angle limiter.

This steering-angle velocity limiter thus has the advantage of being simple to tune, since it is sufficient to adjust the coefficient $\alpha$. It makes it possible to ensure continuous and smooth (infinitely differentiable) command.

For this purpose, taking into account the form of this steering-angle velocity limiter L2, the following equation Math9 may be written:

$$\dot{\delta}_{ref} = \upsilon \cdot \tanh(\propto (\delta_K - \delta_{ref}))  \quad \text{[Math 9]}$$

A controllability model of the vehicle is thus obtained which is pseudo-linear.

More precisely, the following parameter es may then be introduced:

$$\theta_\delta = \frac{\tanh(\propto \cdot (\delta_K - \delta_{ref}))}{\propto \cdot (\delta_K - \delta_{ref})} \quad \text{[Math 10]}$$

and then the equation Math 10 may be rewritten in the form:

$$\dot{\delta}_{ref} = -\upsilon \cdot \alpha \cdot \theta_\delta \cdot \delta_{ref} + \upsilon \cdot \alpha \cdot \theta_\delta \cdot \delta_K \quad \text{[Math 11]}$$

This equation Math 11 is characteristic of a state representation, and it shows that the setpoint variation limiting model is linear as a function of the parameter es.

On this basis, it is then possible to determine the controller which ensures good following of the evasion trajectory T0, which satisfies the setpoint variation limiting model and which complies with the condition stipulated by the coefficient $\alpha_{DB}$.

The saturation of the yaw-moment setpoint $M_{z\_ref}$ may be formulated in the following way:

$$|M_{z\_ref}| \leq M_{z\_max} \quad \text{[Math 12]}$$

The saturation of the rate of variation of the yaw-moment setpoint $M_{z\_ref}$ may be formulated in the following way:

$$|\dot{M}_{z\_ref}| \leq \nabla_{Mz}^{ctrl} \quad \text{[Math 13]}$$

According to the invention, the amplitude and the rate of variation of the yaw-moment setpoint $M_{z\_ref}$ are intended to be limited not by imposing a severe threshold, but instead by using a setpoint amplitude limiter and a setpoint variation limiter.

Referring to FIG. 4, the amplitude limiter that will be used here to modify the non-saturated yaw-moment setpoint $M_{Kz}$, in order to generate a semi-saturated yaw-moment setpoint $M_{z\_sat}$, may first be described.

This amplitude limiter is noteworthy insofar as it forms a closed-loop pseudo-controller which has:
- a direct-chain transfer function equal to the product of the limit $M_{z\_max}$ (in order to comply with the condition stipulated by the equation Math 12) and a corrector, which is a function of the hyperbolic tangent type of $\beta_1 \cdot \varepsilon_1$,
- an indirect-chain (or "feedback-chain") transfer function equal to one.

In this FIG. 4, the coefficient $\varepsilon_1$ corresponds to the deviation between the variables $M_{z\_sat}$ and $M_{Kz}$. The coefficient $\beta_1$ is a constant between 0 and infinity, which is the one and only parameter making it possible to affect the rapid or flexible nature of the amplitude limiter.

The use of such a pseudo-controller makes it possible not only to time-limit the yaw-moment setpoint $M_{z\_ref}$ well, but furthermore to ensure continuity of the variation of this setpoint.

Taking into account the form of this amplitude limiter, the equation Math14 may be written:

$$M_{z\_sat} = M_{z\_max} \cdot \tanh(\beta_1 \cdot (M_{z\_sat} - M_{Kz})) \quad \text{[Math 14]}$$

As shown by FIG. 4, the rate of variation limiter of the yaw moment is also noteworthy in that it forms a closed-loop pseudo-controller, which has:
- a direct-chain transfer function equal to the product of the constant $\nabla_{Mz}^{ctrl}$ (in order to comply with the condition stipulated by the equation Math 13), a 1/s integrator and a corrector, which is a function of the hyperbolic tangent type of $\beta_2 \cdot \varepsilon_2$,
- an indirect-chain (or "feedback-chain") transfer function equal to one.

It receives as input the semi-saturated yaw-moment setpoint $M_{z\_sat}$ and transmits as output the yaw-moment setpoint $M_{z\_ref}$.

In this figure, the coefficient $\varepsilon_2$ corresponds to the deviation between the variables $M_{z\_ref}$ and $M_{z\_sat}$. The coefficient $\beta_2$ is a constant between 0 and infinity, which is the only parameter making it possible to affect the rapid or flexible nature of the velocity limiter.

The use of such a corrector makes it possible not only to time-limit the yaw-moment variations well, but furthermore to ensure continuity of this variation.

Taking into account the form of this velocity limiter, the equation Math15 may be written:

$$\dot{M}_{z\_ref} = \nabla_{Mz}^{ctrl} \cdot \tanh(\varepsilon_2(M_{z\_sat} - M_{z\_ref})) \quad \text{[Math 15]}$$

A controllability model of the vehicle is thus obtained which is pseudo-linear.

Some variables may now be introduced to simplify the expressions of equations Math 14 and Math 15, in order to represent the full model quasi-linearly (that is to say in the manner of LPV, Linear Parameter Varying), in the form of a state representation.

The equation Math 14 may be written in the form of an equation Math16:

$$M_{z_{sat}} = M_{z\_max} \cdot \beta_1 \cdot (M_{z_{sat}} - M_{Kz})\rho \quad \text{[Math 16]}$$

with $$\rho = \frac{\tanh(\beta_1(M_{zK} - M_{z\_sat}))}{\beta_1(M_{zK} - M_{z\_sat})} \quad \text{[Math 17]}$$

The following parameter $\theta_\Delta$ may then be introduced:

$$\theta_\Delta = \frac{\rho}{1 + \Delta\beta_1\rho} \frac{\Delta}{\overline{M}_z^{ctrl}} \quad \text{[Math 18]}$$

Next, the equation Math 15 may be rewritten in the form of an equation Math19:

$$\dot{M}_{z\_ref} = -a_1\theta_\nabla M_{z\_ref} + a_2\theta_{\nabla\Delta} M_{zK} \quad \text{[Math 19]}$$

with $$a_1 = \nabla\beta_2 \quad \text{[Math 20]}$$

$$a_2 = \nabla \overline{M}_z \beta_1 \beta_2 \quad \text{[Math 21]}$$

$$\theta_{\nabla\Delta} = \theta_\nabla \theta_\Delta \quad \text{[Math 22]}$$

$$\theta_\nabla = \frac{\tanh(\beta_2(M_{z\_sat} - M_{z\_ref}))}{\beta_2(M_{z\_sat} - M_{z\_ref})} \quad \text{[Math 23]}$$

The equation Math 19 is characteristic of a state representation, and it shows that the full yaw-moment amplitude and velocity limiting model is quasi-linear as a function of the exogenous parameters $\theta_{\nabla A}$ and $\theta_V$ (parameters which can be calculated when the vehicle is in motion).

The bicycle model of equation Math 7 may then be enhanced with this state representation in order to obtain a new usable model.

In this way, it is possible to synthesize the controllers (represented in FIG. 6 by $K_\delta$, $K_M$ and by the blocks Z3 and Z4) by an optimization method such as that of linear matrix inequalities.

These controllers may then be implemented in the computers 13 of motor vehicles 10 of the production series of the motor vehicle on which the trials were carried out.

By way of example, the way in which the synthesis of the first controller (the one that makes it possible to obtain the steering-angle setpoint $\delta_{ref}$) is carried out may be described. The synthesis of the second controller (the one that makes it possible to obtain the yaw-moment setpoint) will be performed in a corresponding way, and will therefore not be described in detail here.

The enhanced bicycle model of equation Math 7 is written:

$$\begin{pmatrix} \dot{\beta} \\ \dot{r} \\ \dot{\psi}_L \\ \dot{e}_{y_L} \\ \ddot{\delta} \\ \dot{\delta} \\ \dot{y}_{L\_ref} \\ \dot{\delta}_{ref} \end{pmatrix} = $$ [Math 24]

$$\begin{bmatrix} -\frac{C_f+C_r}{mV} & 1+\frac{C_r l_r - C_f l_f}{mV^2} & 0 & 0 & 0 & \frac{C_f}{mV} & 0 & 0 \\ -\frac{C_f l_f - C_r l_r}{J} & -\frac{C_r l_r^2 - C_f l_f^2}{JV} & 0 & 0 & 0 & \frac{C_f l_f}{J} & 0 & 0 \\ 0 & 1 & 0 & 0 & 0 & 0 & 0 & 0 \\ V & l_s & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ 0 & 0 & 0 & 0 & 0 & 0 & 0 & -va\theta_2 \end{bmatrix}$$

$$\begin{pmatrix} \beta \\ r \\ \psi_L \\ e_{y_L} \\ \dot{\delta} \\ \delta \\ y_{L\_ref} \\ \delta_{ref} \end{pmatrix} + \begin{bmatrix} 0 \\ 0 \\ 0 \\ 0 \\ 0 \\ 0 \\ 0 \\ va\theta_2 \end{bmatrix} \delta_K + \begin{bmatrix} 0 \\ 0 \\ 0 \\ 0 \\ 0 \\ 0 \\ \omega_f \\ 0 \end{bmatrix} w$$

A state vector x may then be considered, which can be written in the form:

$$x = (\beta \, r \, \psi_L \, e_{y_L} \, \dot{\delta} \, \delta \, y_{L\_ref} \, \delta_{ref})^T$$ [Math 25]

The aim is then to determine the form of the controller Ks which is the state feedback making it possible to calculate the non-saturated steering-angle setpoint $\delta_K$ on the basis of this state vector x.

In order to understand how to determine a controller Ks that is suitable in terms of both stability and rapidity, our behavioral model may now be written in a generic form:

$$\begin{cases} \dot{x} = A(\theta_\delta)x + B_u(\theta_\delta) \cdot \delta_{ref} + B_w w \\ y = C_y \cdot x \end{cases}$$ [Math 26]

In this equation, $C_y$ is the identity matrix, A is a dynamic matrix, $B_u$ is a command matrix and $B_w$ is a perturbation matrix, which may be written in the form:

[Math 27]

$$A = \begin{bmatrix} -\frac{C_f+C_r}{mV} & 1+\frac{C_r l_r - C_f l_f}{mV^2} & 0 & 0 & 0 & \frac{C_f}{mV} & 0 & 0 \\ -\frac{(C_f l_f - C_r l_r)}{J} & -\frac{(C_r l_r^2 - C_f l_f^2)}{JV} & 0 & 0 & 0 & \frac{C_f l_f}{J} & 0 & 0 \\ 0 & 1 & 0 & 0 & 0 & 0 & 0 & 0 \\ V & l_s & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ 0 & 0 & 0 & 0 & 0 & 0 & 0 & -va\theta_2 \end{bmatrix},$$

$$B_u = \begin{bmatrix} 0 \\ 0 \\ 0 \\ 0 \\ 0 \\ 0 \\ 0 \\ va\theta_2 \end{bmatrix}, B_w = \begin{bmatrix} 0 \\ 0 \\ 0 \\ 0 \\ 0 \\ 0 \\ \omega_f \\ 0 \end{bmatrix},$$

The controller $K_\delta$, which is defined as a static state feedback, may for its part be expressed in the form:

$$\delta_K = K_\delta \cdot x$$ [Math 28]

In order to find an optimal controller $K_\delta$, various methods may be used.

The method used here is that of linear matrix inequalities. It is thus carried out on the basis of convex-optimization criteria under constraints of linear matrix inequalities.

The aim is more precisely to optimize the gains of the closed loop defined by the controller $K_\delta$ by varying on the choice of the poles.

Three matrix inequalities are used, and these are defined by the following inequalities.

$$A_i Q + B_i R + (A_i Q + B_i R)^T + 2\mu Q < 0$$ [Math 29]

$$\begin{bmatrix} -\gamma Q & A_i Q + B_i R \\ * & -\gamma Q \end{bmatrix} < 0$$ [Math 30]

$$\begin{bmatrix} \sin(\varphi)(A_i Q + B_i R + & \cos(\varphi)(A_i Q + B_i R - \\ (A_i Q + B_i R)^T) & (A_i Q + B_i R)^T) \\ * & \sin(\varphi)(A_i Q + B_i R - \\ & (A_i Q + B_i R)^T) \end{bmatrix} < 0$$ [Math 31]

In these inequalities, i is equal to 1 or 2, and the matrices $A_i$ and $B_i$ may then be defined in the following way:

$$A_1 = A(\theta_{\delta min})$$

$$A_2 = A(\theta_{\delta max})$$

$$B_1 = B_u(\theta_{\delta min})$$

$$B_2 = B_u(\theta_{\delta max})$$ [Math 32]

A matrix of the form $$\begin{bmatrix} X & Y \\ Y^T & W \end{bmatrix}$$

is written in the form $$\begin{bmatrix} X & Y \\ * & W \end{bmatrix}.$$

The controller $K_\delta$ is defined by the equation:

$$K_\delta = R \cdot Q^{-1} \qquad \text{[Math 33]}$$

The velocity of the vehicle is assumed to be constant (and all the matrices of the system are therefore deemed to be constant).

The three inequalities make it possible to ensure that the dynamics of the closed loop remain limited. This is because, by virtue of these constraints, the poles of the closed loop become bounded in a zone defined by a radius $\gamma$, a minimum distance from the imaginary axis $\mu$, and an aperture angle $\varphi$.

This method proves effective because it involves determining the steering-wheel angle at each instant in a way which is reasonable (and can be mastered by a driver with average competence) and in a way which can be performed by the actuator. These constraints also ensure stability of the closed loop.

The aim here is to minimize the radius $\gamma$. Once the controller $K_\delta$ has been obtained, the non-saturated steering-angle setpoint may be obtained calculated by means of the following formula:

$$\delta_K = Kx = \begin{bmatrix} k_\beta & k_r & k_{\psi_L} & k_{e_{y_L}} & k_{\dot\delta} & k_\delta & k_{\dot y_{L\_ref}} & k_{\delta_{ref}} \end{bmatrix} \begin{pmatrix} \beta \\ r \\ \psi_L \\ e_{y_L} \\ \dot\delta \\ \delta \\ \dot y_{L\_ref} \\ \delta_{ref} \end{pmatrix} \qquad \text{[Math 33]}$$

The values $\theta_{\delta min}$ and $\theta_{\delta max}$ have been introduced into the three matrix inequalities.

The value of $\theta_\delta$, which is linked to the deviation between $\delta_K$ and $\delta_{ref}$, reflects the level of violation by the controller Ks of the controllability limit set down by the equation Math 8.

By definition, $\theta_\delta$ lies between 0 (exclusive) and 1 (inclusive). When $\theta_\delta$ is equal to 1, the calculated non-saturated setpoint of the angle at the steering wheel $\delta_K$ complies well with the controllability limit. When it is close to 0, the calculated non-saturated setpoint of the angle at the steering wheel $\delta_K$ has a value which imposes steering dynamics that are too great, which generates a risk of instability of the vehicle. When $\theta_\delta$ takes intermediate values between 0 and 1, the controllability limit is not complied with but it is possible for there to be no risk of instability of the vehicle.

In other words, the choice of the values $\theta_{\delta min}$ and $\theta_{\delta max}$ has a direct impact on the performance and the robustness of the controller Ks. The larger the interval $[\theta_{\delta min}, \theta_{\delta max}]$ is, the less well the controller $K_\delta$ performs, but the more robust it is. Conversely, the smaller this interval is, the better the controller $K_\delta$ performs but the less robust it is.

Logically, the value $\theta_{\delta max}$ is selected to be equal to 1 (a case according to which the controller $K_\delta$ functions in linear mode, as is moreover generally the case, without controllability constraint violation).

The determination of the value $\theta_{\delta min}$, on the other hand, requires making a compromise between performance and robustness. The determination of this value equates to imposing a maximum threshold for the deviation, in absolute value, between $\delta_K$ and $\delta_{ref}$.

In summary, the method for calculating the controller Ks that is suitable for a particular motor vehicle model consists in fixing on values of $\alpha_{DB}$, v, $\alpha$, $\theta_{\delta min}$ and $\theta_{\delta max}$.

It next consists in determining the coefficients of the matrices $A_i$, $B_i$, then in solving the equations Math 29 to Math 31 in order to deduce therefrom a controller $K_\delta$ that ensures good following of the evasion trajectory T0 and satisfies the steering-angle setpoint variation limiting model.

The block Z2 may now be described in more detail.

The way in which the coefficient $\alpha_{DB}$ is obtained, which it will be recalled illustrates the proportion of differential braking and steering angle to be applied, may now be described.

For this purpose, a preliminary variable $\alpha_{DB\_raw}$ is initially selected.

This choice is made only if the torque exerted by the driver on the steering wheel is less than or equal to, in absolute value, the threshold $T_{Driver\_Mz}^{ctrl}$.

Specifically, if it is greater than this threshold, no setpoint will be calculated.

In the case in which it is less than or equal to the threshold $T_{Driver\_Mz}^{ctrl}$, the preliminary variable $\alpha_{DB\_raw}$ is selected to be equal to 1 if the two following cumulative conditions are fulfilled. Otherwise, it is selected to be equal to zero.

The first condition is that the variable $\theta_\delta$, in absolute value, is less than or equal to a variable $\theta_\delta^{min}$ in absolute value.

This variable $\theta_\delta^{min}$ is the minimum value of the variable $\theta_\delta$ at which the steering-angle controller $K_\delta$ on its own can stabilize the vehicle. It is a variable since it depends on the velocity V of the vehicle.

In other words, the first condition consists in checking whether or not the steering-angle setpoint is saturated.

The second condition is that the yaw velocity is less than or equal to, in absolute value, the yaw velocity threshold $r^{ctrl}$ in absolute value.

Once the value (0 or 1) of the preliminary variable $\alpha_{DB\_raw}$ has been chosen, it is possible to calculate the coefficient $\alpha_{DB}$ by means of the following equation:

$$\alpha_{DB} = \frac{\tau_{DB}}{s + \tau_{DB}} \alpha_{DB\_raw} \qquad \text{[Math 24]}$$

In this equation, the parameter $\tau_{DB}$ is a time constant that makes it possible to filter any abrupt change of the coefficient $\alpha_{DB}$ in order to guarantee a good feel for the driver. The value of this parameter is therefore adjustable according to the feel that the driver wishes to have.

The parameters is the Laplace variable.

At this stage, the process that will be executed by the computer 13 of one of the motor vehicles of the aforementioned production series, in order to carry out the invention, may be described.

Here, the computer 13 is programmed in order to carry out this process recursively, that is to say step-by-step, and in a loop.

For this purpose, during a first step, the computer 13 checks that the automatic obstacle evasion function (AES) is activated.

If this is the case, it attempts to detect the presence of a possible obstacle lying on the path of the motor vehicle 10. For this purpose, it uses its RADAR or LIDAR remote detector.

In the absence of an obstacle, this step is repeated in loops.

As soon as an obstacle 20 is detected (see FIG. 2), the computer 13 plans an evasion trajectory T0 making it possible to avoid this obstacle 20.

The computer 13 will then try to define piloting setpoints for the conventional steering system and for the differential-braking system, which make it possible to follow this evasion trajectory T0 optimally.

For this purpose, it starts by calculating or measuring parameters, these parameters characterizing in particular the dynamic behavior of the vehicle, such as:
- the measured steering angle $\delta$,
- the time derivative of the measured steering angle $\delta$,
- the saturated steering-angle setpoint $\delta_{ref}$ obtained in the preceding time increment,
- the yaw velocity r,
- the relative heading angle $\Psi_L$,
- the time derivative of the lateral deviation setpoint $y_{L-ref}$,
- the trajectory following error $e_{yL}$,
- the drift angle $\beta$,
- the coefficient $\alpha_{DB}$.

As shown by FIG. 6, the computer 13 next uses the controllers $K_\delta$ and $K_M$ stored in its memory. These controllers will therefore make it possible to determine the values of the non-saturated steering-angle setpoint $\delta_K$ and non-saturated yaw angle setpoint $M_{Kz}$.

The pseudo-controllers represented in FIG. 6 by the blocks Z3 and Z4 will next make it possible to deduce therefrom the saturated setpoints of steering angle $\delta_{ref}$ and yaw moment $M_{z\_ref}$. These setpoints will then be transmitted to the actuators 31, 32 in order to divert the vehicle from its initial trajectory.

In other words, it is therefore the combination of the controller $K_\delta$ and the pseudo-controller represented by the block Z3 which will form a first overall controller making it possible to determine the steering-angle setpoint $\delta_{ref}$ on the basis of the parameters listed above.

Likewise, it is the combination of the controller $K_M$ and the pseudo-controller represented by the block Z4 which will form a second overall controller making it possible to determine the yaw-moment setpoint $M_{z\_ref}$ on the basis of the parameters listed above.

The present invention is in no way limited to the embodiment described. Rather, a person skilled in the art will know how to add thereto any variant according to the invention.

The invention claimed is:

1. A process for automated piloting of a motor vehicle having wheels, at least two of the wheels being steered wheels, the process comprising:
   acquiring parameters relating to a trajectory for the motor vehicle to avoid an obstacle;
   calculating by a computer a first piloting setpoint of a steering-angle actuator of the steered wheels and a second piloting setpoint of at least one differential-braking actuator of the wheels, as a function of said parameters,
   wherein the first piloting setpoint and the second piloting setpoint are each determined by a controller that satisfies a setpoint amplitude and/or variation limiting model, and
   wherein the first piloting setpoint and the second piloting setpoint are determined as a function of a coefficient that fixes a contribution of each actuator, said coefficient being calculated as a function of a yaw velocity of the motor vehicle, a torque applied by a driver to a steering wheel of the motor vehicle and a parameter, a value of which varies according to whether or not the first piloting setpoint is limited by the controller; and
   controlling the steering-angle actuator of the steered wheels based on the first piloting setpoint and controlling the differential-braking actuator of the wheels based on the second piloting setpoint.

2. The process as claimed in claim 1, wherein the coefficient is calculated so that:
   the second piloting setpoint is zero when an absolute value of the torque applied by the driver to the steering wheel of the motor vehicle exceeds a predetermined threshold,
   only the steering-angle actuator of the steered wheels is used when the yaw velocity of the motor vehicle is greater than a control threshold and/or when the piloting setpoint on its own makes it possible to stabilize the motor vehicle, and
   otherwise, the steering-angle actuator of the steered wheels and the differential-braking actuator of the wheels are used in combination.

3. The process as claimed in claim 2, wherein the coefficient is calculated so as to vary continuously as a function of time.

4. The process as claimed in claim 1, further comprising interrupting the determination of the first piloting setpoint when an absolute value of the torque applied by the driver to the steering wheel of the motor vehicle exceeds a predetermined threshold.

5. The process as claimed in claim 1, further comprising interrupting the determination of the second piloting setpoint when an absolute value of the torque applied by the driver to the steering wheel of the motor vehicle exceeds a predetermined threshold.

6. The process as claimed in claim 1, wherein the controller making it possible to determine the second piloting setpoint satisfies an amplitude limiting model, so that the second piloting setpoint remains less than or equal to a limit, and wherein said limit is determined as a function of a velocity and the yaw velocity of the motor vehicle.

7. The process as claimed in claim 1, wherein, in order to calculate the first piloting setpoint, provision is made to determine a first non-saturated setpoint and to deduce the first setpoint therefrom by a closed-loop pseudo-controller having a direct-chain transfer function that comprises a function of a hyperbolic tangent type of a deviation between the first non-saturated setpoint and the first setpoint.

8. The process as claimed in claim 1, wherein, in order to calculate the second setpoint, provision is made:
   to determine a second non-saturated setpoint and to deduce a second semi-saturated setpoint therefrom by a closed-loop pseudo-controller having a direct-chain transfer function that comprises a function of a hyperbolic tangent type of a deviation between the second non-saturated setpoint and the second semi-saturated setpoint, then to use another closed-loop pseudo-controller, which provides the second setpoint as output and the direct-chain transfer function of which comprises a function of a hyperbolic tangent type of a deviation between the second semi-saturated setpoint and said second setpoint.

9. A method for creating controllers for the process as claimed in claim 1, the method comprising:
   acquiring a behavioral matrix model of the motor vehicle;
   determining at least some coefficients of matrices of the behavioral matrix model;
   deducing two controllers therefrom, each of which satisfies a piloting setpoint amplitude limiting model and/or a piloting setpoint variation limiting model.

10. A motor vehicle comprising:
    a steering-angle actuator of the steered wheels, a differential-braking actuator of the steered wheels, and a computer configured to pilot said actuators,
    wherein the computer is programmed in order to carry out the process as claimed in claim 1.

* * * * *